(12) United States Patent
Asur et al.

(10) Patent No.: US 9,176,969 B2
(45) Date of Patent: Nov. 3, 2015

(54) INTEGRATING AND EXTRACTING TOPICS FROM CONTENT OF HETEROGENEOUS SOURCES

(71) Applicant: Hewlett-Packard Development Company, L.P., Fort Collins, CO (US)

(72) Inventors: Sitaram Asur, Mountain View, CA (US); Rumi Ghosh, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 180 days.

(21) Appl. No.: 14/014,122

(22) Filed: Aug. 29, 2013

(65) Prior Publication Data

US 2015/0066904 A1 Mar. 5, 2015

(51) Int. Cl.
G06F 17/30 (2006.01)

(52) U.S. Cl.
CPC .................................. *G06F 17/301* (2013.01)

(58) Field of Classification Search
CPC ................ G06F 17/30554; G06F 17/30424; G06F 17/30867; G06F 17/30864; G06F 17/3053
USPC ........................................................ 707/722
See application file for complete search history.

(56) References Cited

U.S. PATENT DOCUMENTS

| 7,333,985 B2 | 2/2008 | Weare |
| 2008/0177848 A1 | 7/2008 | Wakhlu |
| 2009/0007098 A1 | 1/2009 | Chevrette et al. |
| 2011/0106743 A1 | 5/2011 | Duchon |
| 2012/0101965 A1* | 4/2012 | Hennig et al. ................... 706/12 |
| 2012/0239668 A1* | 9/2012 | Bhattacharyya et al. ..... 707/754 |
| 2013/0073336 A1* | 3/2013 | Heath .......................... 705/7.29 |
| 2013/0159236 A1* | 6/2013 | Vladislav et al. .............. 706/46 |
| 2013/0159254 A1* | 6/2013 | Chen et al. .................... 707/639 |
| 2015/0046151 A1* | 2/2015 | Lane et al. ........................ 704/9 |

OTHER PUBLICATIONS

Albert Weichselbralm, "Knowledge Capture From Multiple Online Sources with the Extensible Web RetrieVal Toolkit (eWRT)," Jun. 23-26, 2013, http://eprints.weblyzard.com/65/1/kcap-ewrt.pdf.
Xinyan Xiao, "A Topic Similarity Model for Hierarchical Phrase-based Translation," Jul. 8-14, 2012, http://www.aclweb.org/anthoiogy-new/P/P12/P12-1079.pdf.

* cited by examiner

*Primary Examiner* — Cam-Y Truong
(74) *Attorney, Agent, or Firm* — Hewlett-Packard Patent Department

(57) ABSTRACT

Examples relate to integrating and extracting topics from content of heterogeneous sources. Observed words are identified in documents, which are received from the heterogeneous sources. Next, document metadata and source metadata are obtained from the heterogeneous sources. The document metadata is used to calculate word topic probabilities for the observed words, and the source metadata is used to calculate source topic probabilities for the observed words. A latent topic is then determined for one of the documents based on the observed words, the word topic probabilities, and the source topic probabilities.

8 Claims, 6 Drawing Sheets

INTEGRATING AND EXTRACTING TOPICS FROM CONTENT OF HETEROGENEOUS SOURCES

BACKGROUND

The growth of social media and information sources on the Internet has highlighted the desire to organize and categorize content available to users from various information sources. Topic models have been developed and used to perform document analysis to discover the characteristics of content from sources. A typical topic model is designed to analyze content from a single source or to analyze collections of content such as scholarly journals.

BRIEF DESCRIPTION OF THE DRAWINGS

The following detailed description references the drawings, wherein.

DETAILED DESCRIPTION

Figure 1:
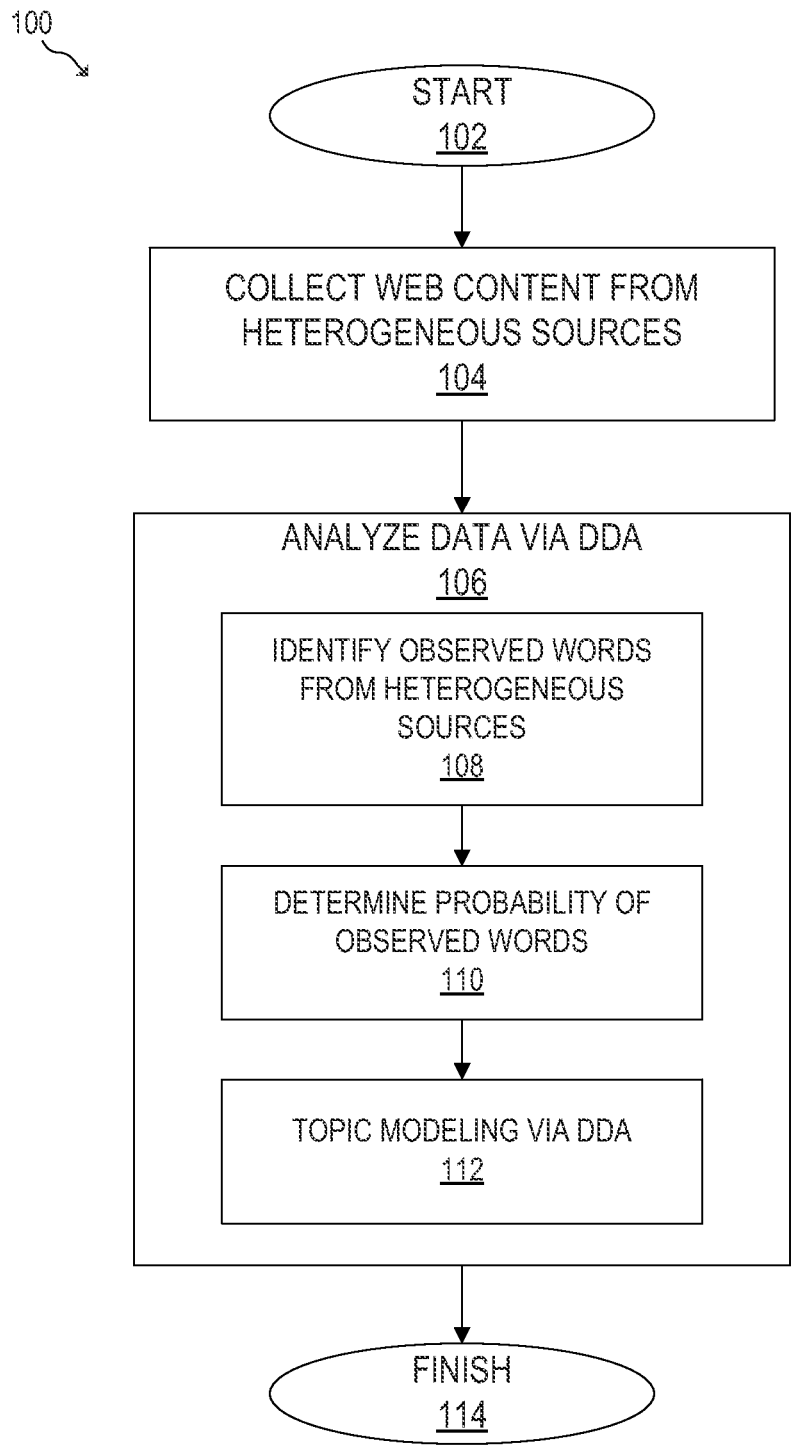
FIG. 1 is a flowchart of an example method for execution by a computing device for integrating and extracting topics from content of heterogeneous sources.

As detailed above, a user may access content (i.e., documents) from various heterogeneous sources. Specifically, a user may read new articles on a news web site, posts in a blog, a feed in social media, documents in an online repository, reviews of products, comments on social media content, emails, posts in discussion forums, etc. The various sources may include redundancy and noise that should be overcome in order for relevant and actionable information to be extracted from the documents. Further, the sources generate documents that differ in size, frequency, expertise, and relevance. For example, a social network may produce documents that are short and posted at high rates; however, social networks typically include high degrees of noise. In contrast, news articles are longer and written to cover particular events, where multiple news stories may cover the same event. In yet another example, blog posts are typically longer and less frequent than news or social media documents. Blog posts also tend to be more opinionated and subjective.

Applications such as social search and document recommendation may be provided to crawl and categorize documents from various sources for easy retrieval. Integration relates to the combination of data from different sources so as to reduce noise and perform data compression while retaining the essence or summary of the contextually relevant information generated by these sources. Topic models such as latent Dirichlet allocation (LDA) and probabilistic latent semantic analysis (PLSA) have been developed and used extensively for document analysis. These topic models are typically applied to text documents. Further, there has not been extensive research on the application of these topic models in the context of multiple heterogeneous information sources Examples disclosed herein provide for the integration and extraction of topics from documents of heterogeneous sources. In various examples, observed words are identified in documents, which are received from the heterogeneous sources. Next, document metadata and source metadata are obtained from the heterogeneous sources. The document metadata is used to calculate word topic probabilities for the observed words and the source metadata is used to calculate source topic probabilities for the observed words. A latent topic is then determined for one of the documents based on the observed words, the word topic probabilities, and the source topic probabilities.

In this manner, the examples disclosed herein simplify the processing and categorization of documents (e.g., news articles, blog posts, social media posts, documents, reviews of products, social media comments, emails, discussion forums posts, etc.) by aggregating multiple heterogeneous sources of documents to extract global topics from the sources. Specifically, by preserving the inter-document, intra-document, intra-source and inter-source statistical relationships for tasks like classification, documents from diverse sources may be processed such that the main essence or information of the documents from each of the different sources is extracted.

FIG. 1 is a flowchart of an example method 100 for execution by a computing device for integrating and extracting topics from content of heterogeneous sources. Although execution of method 100 is described below with reference to computing device 200 of FIG. 2, other suitable devices for execution of method 100 may be used. Method 100 may be implemented in the form of executable instructions stored on a machine-readable storage medium and/or in the form of electronic circuitry.

Method 100 may start in block 102 and continue to block 104, where computing device 100 may collect documents from heterogeneous sources. Examples of heterogeneous sources may include a social media source, a blog source, a news source, a radio show source, a document repository source, an online retailer source, an email source, a discussion forum source, etc. The documents of a user may be collected from registered sources and stored separately, where each of the sources is described by characteristics. For example, a social media source may have a maximum length for its documents. In another example, a news source may provide references for substantiating its documents. In yet another example, a blog source may be designated as mostly including subjective content that is attributable to the author. In this case, the heterogeneous sources may be monitored to determine their characteristics.

In block 106, the documents collected in block 104 are analyzed by applying a Discriminative Dirichlet Allocation (DDA) modeling technique. DDA models the dependence of latent topics on the observed words for a collection of documents. Accordingly, DDA maximizes the probability of topics assigned to individual words given certain features. Examples of features for the model may use include the probability of a topic given a document, the probability of a topic given a word occurrence in a source, the probability of a topic given the word occurrence in all sources, etc. In the scenario where the features are topic-word, topic-document and topic-source relationships, DDA attempts to maximize the conditional probability as follows:

$$P(Z, \theta, \psi; W, \overline{\alpha}, \overline{X}, \omega_1) = \qquad (1)$$

$$\prod_{i=1}^{V} P(\psi_i^g; \overline{X}) \prod_{s=1}^{S} P(\psi_i^s; \overline{X}) \prod_{j=1}^{M^s} P(\theta_j^s; \overline{\alpha}) \prod_{x=1}^{N^s} P(Z_{j,x}^s \mid \theta_j^s)$$

$$P^{1-\epsilon}(Z_{j,x}^s \mid \psi_{w_{j,x}^s}^g, \omega_1) P^{\epsilon}(Z_{j,x}^s \mid \psi_{w_{j,x}^s}^s)$$

The plate notation for the equation (1) above is discussed below with respect to FIG. 5. In this example, $\psi_i^g$ is the global topic distribution of word i, $\psi_i^s$ is the local topic distribution of word i in source s, $\theta_j^s$ is the topic distribution of document j in source s, $\psi_{w_{j,x}}^s$ is the topic distribution of the word, i, associated with the word $w_{j,x}^s$ in source s, $M^s$ is the number of documents in source s, S is the number of sources, $Z_{j,x}^s$ is the topic of the $x^{th}$ word in the $j^{th}$ document in source s, V is the number of words in the vocabulary, $M^S$ is the number of documents in source s, $N^s = \sum_{d=1}^{M^s} N_d^s$, where $N_d^s$ is the number of words in document D, $\overline{X}$ is a K-dimensional vector where $\overline{\chi}[v] = \chi v$, the parameter for the Dirichlet prior on the per-word topic distributions, $\overline{\alpha}$ is a K-dimensional vector where $\overline{\alpha}[k] = \alpha_k$, the parameter for the Dirichlet prior on the per-document topic distributions on the per-topic word distributions, and K is the number of topics.

Initially, the DDA modeling technique involves identifying observed words from the heterogeneous sources in block 108. For example, the documents from each of the sources may be analyzed to identify the unique words occurring within the documents and the quantity of each of the words occurring within each document. In some cases, particular words may be ignored such as common words (e.g., the, a, an, etc.). All of the words identified in the documents of all sources may be designated as the global vocabulary. The words identified in the documents of a single source may be designated as the source vocabulary.

In block 110, the probability of the observed words is determined. Specifically, the probability of a topic k being assigned to this occurrence of word v while taking the global topic distribution of v into account is determined by weighing the importance of this occurrence of word v in source s by the importance of the source s with respect to word v, (i.e., $P(Z_{j,x}^s = k \mid \psi_v^g, \omega_1 = (\psi_{v,k}^g)^{\omega_1^{(s,v)}})$, where $\omega_1^{(s,v)}$ is the weight associated with source s in the global topic distribution of word v, $\psi_{v,k}^g$ is the probability of topic k occurring for word v in source s, and $\psi_v^g$ is the global topic distribution of word v. In block 112, topic modeling is performed using ODA. Specifically, the topic modeling may be performed as discussed below with respect to FIG. 3. After the topic modeling is performed, the model may be used to assign latent topics to documents in the sources. Method 100 may then continue to block 114, where method 100 may stop.

Figure 2:
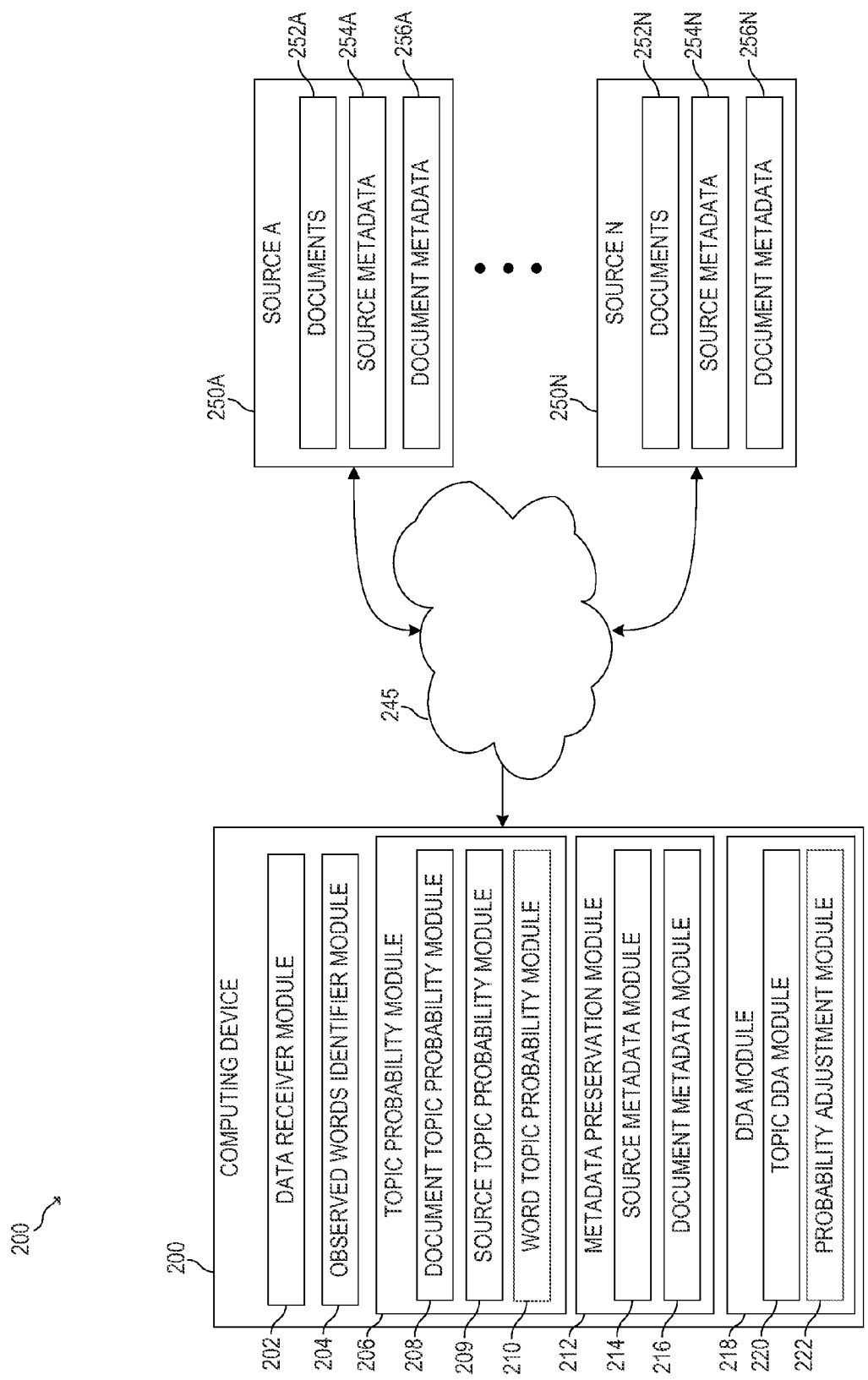
FIG. 2 is a block diagram of an example system for integrating and extracting topics from content of heterogeneous sources.

FIG. 2 is a block diagram of an example computing device 200 in communication via a network 245 with sources 250A, 250N. As illustrated in FIG. 2 and described below, computing device 200 may communicate with sources 250A, 250N to integrate and extract topics from content of heterogeneous sources.

As illustrated, computing device 200 may include a number of modules 202-222. Each of the modules may include a series of instructions encoded on a machine-readable storage medium and executable by a processor of computing device 200. The example computing device 200 can be implemented as, for example, a notebook computer, a desktop computer, an all-in-one system, a tablet computing device, or any other electronic device suitable for integrating and extracting topics from content of heterogeneous sources.

A processor (not shown) of computing device 200 may be one or more central processing units (CPUs), microprocessors, and/or other hardware devices suitable for retrieval and execution of instructions stored in a machine-readable storage medium. The processor may fetch, decode, and execute instructions to enable integrating and extracting topics from content of heterogeneous sources. As an alternative or in addition to retrieving and executing instructions, the processor may include one or more electronic circuits comprising a number of electronic components for performing the functionality of one or more of the instructions.

A machine-readable storage medium (not shown) of computing device 200 may be any electronic, magnetic, optical, or other physical storage device that stores executable instructions. Thus, machine-readable storage medium may be, for example, Random Access Memory (RAM), an Electrically-Erasable Programmable Read-Only Memory (EEPROM), a storage drive, an optical disc, and the like. As described in detail below, the machine-readable storage medium may be encoded with executable instructions for integrating and extracting topics from content of heterogeneous sources.

Data receiver module 202 may document data from sources (e.g., source A 250A, source N 250N, etc.). For example, data receiver module 202 may aggregate documents (e.g., documents 252A, documents 252N, etc.) and associated metadata from various sources (e.g., source A 250A, source N 250N, etc.) that may include blogs, social networks, news sites, online retailers, document repositories, email clients, discussion forums, etc. In some cases, data receiver module 202 may also provide a user interface that allows a user to specify the sources (e.g., source A 250A, source N 250N, etc.) of documents (e.g., documents 252A, documents 252N, etc.). For example, the user may provide login credentials for a source (e.g., source A 250A, source N 250N, etc.) so that the data receiver module 202 may access documents (e.g., documents 252A, documents 252N, etc.) of the source. In other cases, the user may grant access to the data receiver module 202 using an interface provided by the source (e.g., source A 250A, source N 250N, etc.).

Observed words identifier module 204 may analyze documents (e.g., documents 252A, documents 252N, etc.) from the sources (e.g., source A 250A, source N 250N, etc.) to identify observed words. Specifically, observed words identifier module 204 may identify and index each word in each of the documents (e.g., documents 252A, documents 252N, etc.) for each of the sources (e.g., source A 250A, source N 250N, etc.). The identified observed words may then be used to search for words within each of the documents.

Topic probability module 206 may manage topic probabilities for documents (e.g., documents 252A, documents 252N, etc.), sources (e.g., source A 250A, source N 250N, etc.), and words. Although the components of topic probability module 206 are described in detail below, additional details regarding an example implementation of topic probability module 206 are provided above in connection with block 110 of FIG. 1.

Document topic probability module 208 may determine topic probabilities for documents. Specifically, document topic probability module 208 may determine the probability a topic will be assigned to a given document. The probability for the document may be generated based on a document profile associated with the document.

Source topic probability module 209 may determine topic probabilities for a word occurring in a source. Specifically, source topic probability module 209 may determine the probability a topic will be assigned to a document that includes a word and is from a given source. The probability for the source may be generated based on the word and a source profile of the given source.

Word topic probability module 210 may determine topic probabilities for a word occurring in all sources. Specifically, word topic probability module 210 may determine the probability a topic will be assigned to a document that includes a word, where the particular source of the document is considered. The probability distribution for the word may be generated based on the word in a universal context that applies to all the sources.

Metadata preservation module 212 may manage metadata for sources (e.g., source A 250A, source N 250N, etc.) and documents (e.g., documents 252A, documents 252N, etc.).

Source metadata module 214 may use source metadata obtained by data receiver module 202 to create a source profile for each of the sources (e.g., source A 250A, source N 250N, etc.). A source profile may describe various characteristics of a source (e.g., source A 250A, source N 250N, etc.) such as maximum document length, average volume of documents per time interval, general intention of the content in the documents (e g, objective content, subjective content, news content, opinion content, etc.), etc.

Document metadata module 216 may use document metadata obtained by data receiver module 202 to create a document profile for each document in each of the sources (e.g., source A 250A, source N 250N, etc.). A document profile may describe various characteristics of a document such as title, author-designated keywords (e.g., hashtags), author, comments, user voting results (e.g., up votes, down votes, etc.), etc.

DDA module 218 may apply a Discriminative Dirichlet Allocation (DDA) modeling technique to documents and associated metadata. Although the components of DDA module 218 are described in detail below, additional details regarding an example implementation of DDA module 218 are provided above in connection with blocks 108 and 112 of FIG. 1.

Topic DDA module 220 may perform DDA modeling to maximize the probability of topics assigned to the documents (e.g., documents 252A, documents 252N, etc.) of the sources (e.g., source A 250A, source N 250N, etc.). Specifically, topic DDA module 220 may use the topic probability module 206 to generate a probability distribution that includes maximized probabilities for topics that account for document topic probabilities, source topic probabilities, and word topic probabilities from each of the respective components of the Topic DDA module 220. In other words, the maximized topic probabilities account for the relevant document profile and source profile, which ensures that the source and document specific characteristics are preserved. For example, if a prolific source has a high average volume of documents per time interval, the probabilities calculated for the prolific source may account for the higher probability that documents from the prolific source are noise (i.e., the probabilities that a topic is assigned to a document from the prolific source are decreased because it is more likely that the document is noise). In another example, if a news source is designated as having news content, the probabilities calculated for the news source may account for the higher probability that documents from the prolific source are relevant (i.e., the probabilities that a topic is assigned to a document from the news source are increased because it is more likely that the document is related to the topic).

Probability adjustment module 222 may adjust probabilities in the probability distribution generated by the topic DDA module 220. Specifically, probability adjustment module 222 may adjust the probabilities based on a second criterion (the first criterion being maximizing the probabilities) that controls the number of words assigned to each topic. In other words, the second criterion balances the number of words between topics. For example, the bicriterion maximized by the probability adjustment model 222 may be expressed as the following:

$$\frac{P(Z; W, \bar{\alpha}, \bar{X}, \omega_1)}{P(Z; \tau, \omega_2)} = \frac{\int_\psi \int_\theta P(Z, \theta, \psi; W, \bar{\alpha}, \bar{X}, \omega_1) d\theta d\psi}{\int_\eta P(Z|\eta, \omega_2)(P(\eta|\tau)) d\eta} \quad (2)$$

In equation (2), $P(Z_{j,x}{}^s|\eta,\omega_2)$ is the probability of the topic associated with the word $w_{j,x}{}^s$ in the $i^{th}$ document of source s. To control the number of words assigned to each topic and to adjust for biases (e.g., volume bias) introduced due to the variability of sources, for each word $w_{ij}{}^s$, $Z_{ij}{}^s$ is drawn from Multinomial ($\eta$) and is weighed using $\omega_2$. $\eta$ is chosen from the Dirichlet Distribution of $\bar{\tau}$ in the denominator, where $\tau$ is the K-dimensional vector where $\tau[i]=\tau_i$, the parameter for the Dirichlet prior on the number of words per topic distribution. In this example, the relative weights given to the local and global topic distribution of every word are determined by $\epsilon$ ($0 \leq \epsilon \leq 1$). Using collapsed Gibbs sampling for inference, the following can be shown:

$$\max \frac{P(Z_{m,n}^s = k \mid Z_{-(m,n,s)}^s; W, \bar{\alpha}, \bar{X})}{P(Z_{m,n}^s = k \mid Z_{-(m,n,s)}^s; \tau)} \propto \quad (3)$$

$$\left(n_{m,(.)}^{k,(s),-(m,n,s)} + \alpha_k\right) \cdot \left(\left(n_{(.),v}^{k,(s),-(m,n,s)} + X_k\right)\right)^\epsilon \cdot$$

$$\left(\sum_{s_1=1}^S \omega_1^{(s_1,v)} \cdot n_{(.),v}^{k,(s_1),-(m,n,s)} + X_k\right)^{1-\epsilon} \cdot \frac{1}{\left(\sum_{s_1=1}^S \omega_2^{s_1} \cdot n_{(.),.}^{k,(s_1),-(m,n,s)} + \tau_i\right)}$$

In this example, $Z_{m,n}{}^s$ is the topic of the $n^{th}$ word in the $m^{th}$ document in source s, k is a topic, W is a number of words in a vocabulary, $\bar{\alpha}$ is a K-dimensional vector where $\bar{\alpha}[k]=\alpha_k$, the parameter for the Dirichlet prior on the per-document topic distributions on the per-topic word distributions, $\bar{X}$ is a K-dimensional vector where $\bar{\chi}[v]=\chi v$, the parameter for the Dirichlet prior on the per-word topic distributions, $\tau$ is the K-dimensional vector where $\tau[i]=\tau_i$, the parameter for the Dirichlet prior on the number of words per topic distribution, n is the topic distribution of the collection of documents, $\alpha_k$ is a selection for topic k from the Dirichlet prior on the per-document topic distributions on the per-word distribution, and $\chi k$ is a selection for topic k from the Dirichlet prior on the per-word topic distributions. In formula (3), three potential scenarios may be applied to the Gibbs sampling. First, the probability of a topic given word $\omega_1^{(s,v)}=1$ and $\omega_2(s)=1$. In this case for a single source, if $\tau_i=\chi_k$ and $\omega_1^{(s,v)}$ and $\omega_2(s)$ are chosen as discussed above, this scenario reduces to the LDA algorithm. Further, for $\epsilon=0$, if $\tau_i=\chi k$, and for multiple sources, the result of this scenario would reduce to LDA applied on a collection created by pooling all documents of all sources. Second, the probability of topic given word $$\omega_1^{(s,v)} = 1 \text{ and } \omega_2(s) = \frac{N}{S \cdot N^s},$$

where $N=\Sigma_{s=1}^{S}N^s$, S is the number of sources, $N^s=\Sigma_{d=1}^{M^s}N_d^s$ and $N_d^s$ is the number of words in document D in source s. Third, the probability of a topic given word $$\omega_1^{(s,v)} = \frac{N}{S \cdot \sum_{i=1}^{K} n_{(.),v}^{i(s)}} \text{ and } \omega_2(s) = \frac{N}{S \cdot N^s},$$

where $N=\Sigma_{s=1}^{S}N^s$, S is the number of sources, $N^s=\Sigma_{d=1}^{M^s}N_d^s$, $N_d^s$ is the number of words in document D in source s, K is the number of topics, and n is the topic distribution of the collection of documents.

As shown, computing device 200 may interact with a number of sources (e.g., source A 250A, source N 250N, etc.). Each of the sources (e.g., source A 250A, source N 250N, etc.) may manage a different set of documents that are accessible to computing device 200. Further, the sources (e.g., source A 250A, source N 250N, etc.) may manage various types of documents including, but not limited to, blog posts, social network posts, news posts, documents, product reviews, social media comments, emails, discussion forums posts, etc. Each of the sources (e.g., source A 250A, source N 250N, etc.) may be provided by a server computing device (not shown).

Figure 3:
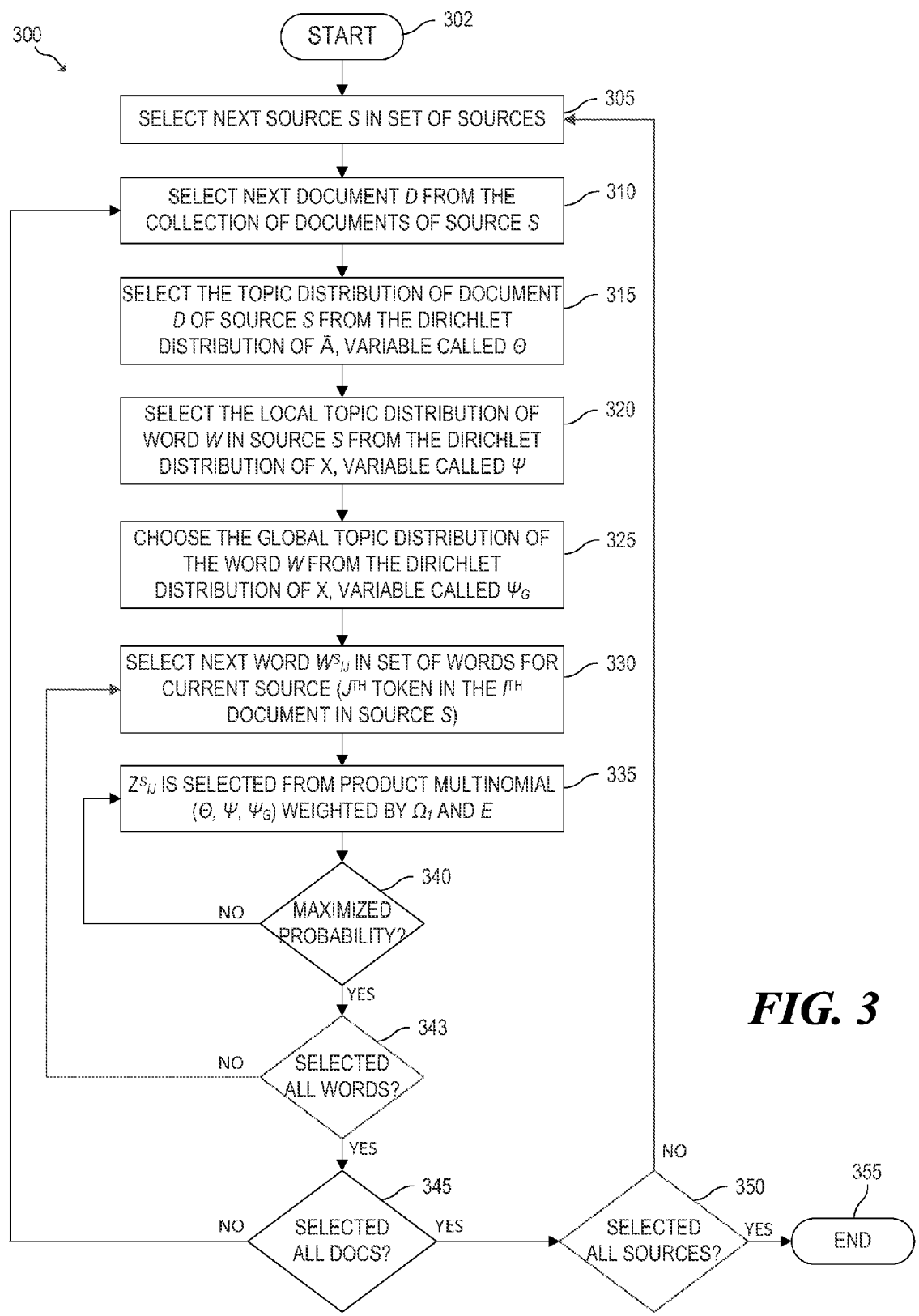
FIG. 3 is a flowchart of an example method for execution by a computing device for integrating and extracting topics from content of heterogeneous sources.

FIG. 3 is a flowchart of an example method 300 for execution by a computing device 200 for integrating and extracting topics from content of heterogeneous sources. Although execution of method 300 is described below with reference to computing device 200 of FIG. 2, other suitable devices for execution of method 300 may be used. Method 300 may be implemented in the form of executable instructions stored on a machine-readable storage medium and/or in the form of electronic circuitry.

Method 300 may start in block 302 and proceed to block 305, where computing device 200 may select next source s in a set of sources. In other words, computing device 200 may iteratively process each of the various sources it is configured to analyze. In block 310, computing device 200 may select the next document d from a collection of documents of source s. In other words, computing device 200 may iteratively process each of the documents of the source s selected in block 305.

In block 315, a topic distribution θ is selected for document d from the Dirichlet distribution of $\overline{\alpha}$. $\overline{\alpha}$ is a K-dimensional (i.e., number of topics) Dirichlet distribution describing the topic probabilities for the given document d. In block 320, a local topic distribution φ is selected for word w in source s from the Dirichlet distribution of $\overline{X}$. $\overline{X}$ is a V-dimensional (i.e., number of words in global vocabulary), Dirichlet distribution describing the topic probabilities for the given word w. In block 325, a global topic distribution $\phi_g$ is selected for word w from the Dirichlet distribution of $\overline{X}$.

In block 330, computing device 200 selects the next word $\omega_{ij}^s$ in the source vocabulary for current source s. In other words, computing device 200 may iteratively process each of the words in the current source s. In block 335, a topic for the $j^{th}$ word in the $i^{th}$ document of source s (i.e., $Z_{ij}^s$) is selected based on a product multinomial (θ, φ, $\phi_g$), weighted by $\omega_1$ and ε.

In block 340, computing device 200 determines if the probability of topics assigned to the selected word are maximized (i.e., convergence) for the specified features. In this example, the specified features considered are (1) probabilities of a topic given a document (θ), (2) probability of a topic given a word occurrence in a source (φ), and (3) probability of a topic given a word occurrence in all sources ($\phi_g$). If the probability of topics is not maximized, method 300 returns to block 335 to select a new topic.

If the probability of topics is maximized, method 300 proceeds to block 343, where computing device 200 determines if all the words in the current document have been processed. If there are more words to process, method 300 returns to block 330 to process the next word. If there are no more words to process, method 300 proceeds to block 345, where computing device 200 determines if there are more documents to process in the selected source s. If there are more documents to process, method 300 returns to block 310 to process the next document. If there are no more documents to process, method 300 proceeds to block 350, where computing device 200 determines if there are more sources to process. If there are more sources to process, method 300 returns to block 305 to process the next source. If there are no more sources to process, method 300 proceeds to block 355, where method 300 may stop.

Figure 4A:
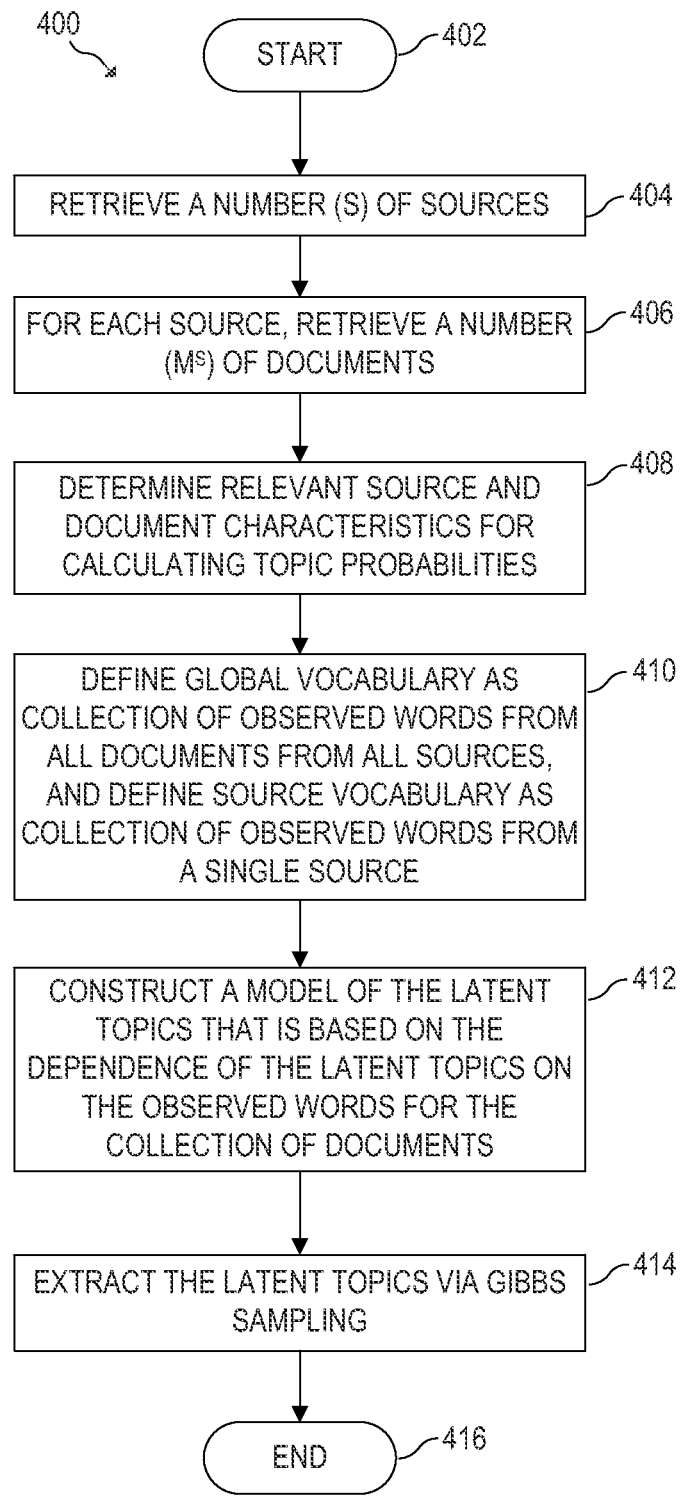
FIGS. 4A and 4B are flowcharts of example methods for execution by a computing device for generating a topic model for integrating and extracting topics from content of heterogeneous sources.
Figure 4B:
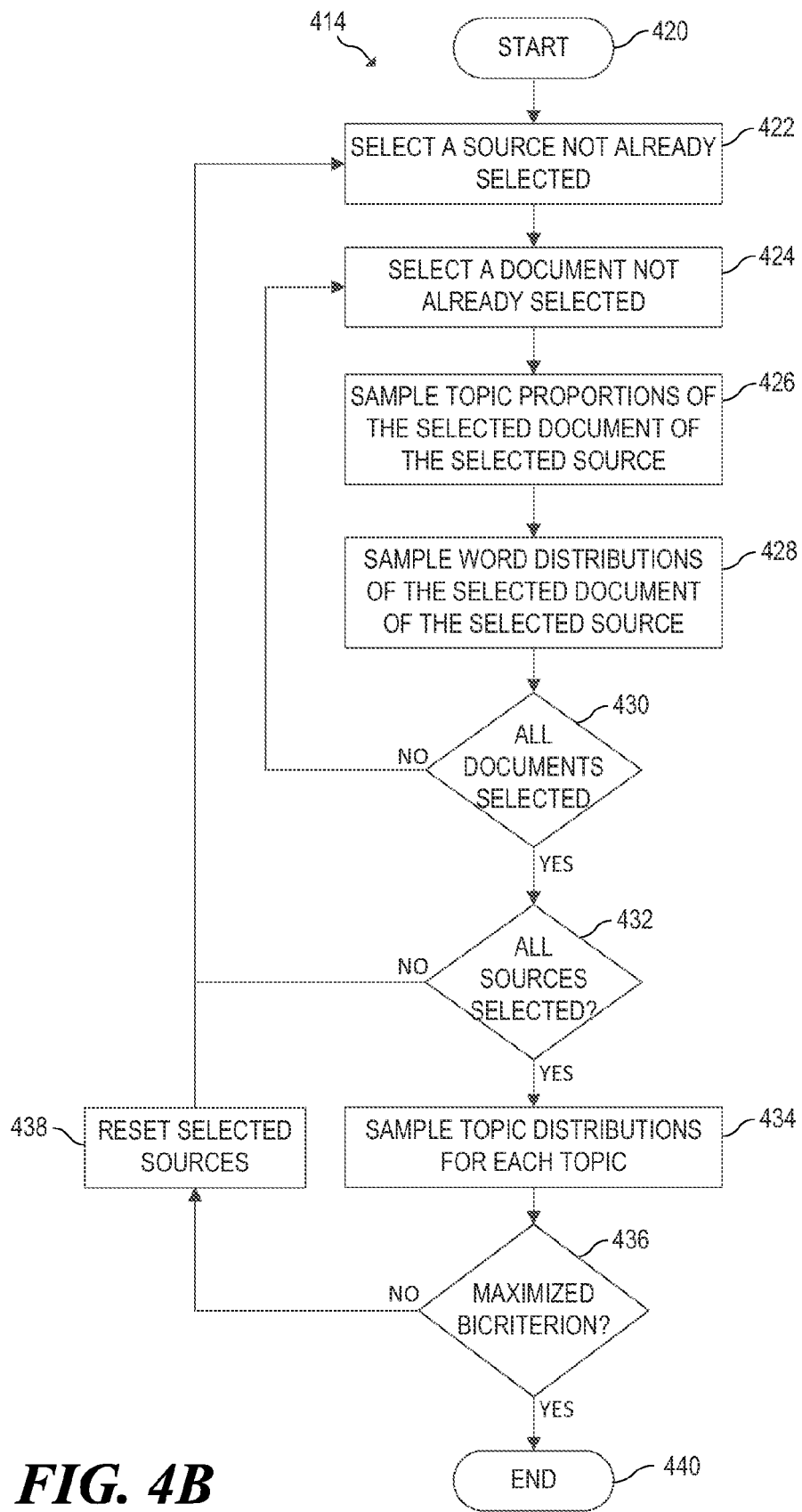

FIGS. 4A and 4B are flowcharts of an example method 400 for execution by a computing device 200 for generating a topic model for integrating and extracting topics from content of heterogeneous sources. Although execution of method 400 is described below with reference to computing device 200 of FIG. 2, other suitable devices for execution of method 400 may be used. Method 400 may be implemented in the form of executable instructions stored on a machine-readable storage medium and/or in the form of electronic circuitry.

In FIG. 4A, method 400 may start in block 402 and proceed to block 404, where computing device 200 retrieves a number (S) of sources. For example, metadata for various content sources may be pre-configured by a user, which may then be retrieved using the authorizations or credentials provided by the user. In block 406, a number of documents ($M^s$) is retrieved for each of the sources. The documents may be obtained from each of the sources using the pre-configured information provided by the user. The documents retrieved may also include metadata describing characteristics of the documents.

In block 408, relevant source and document characteristics are determined for calculating topic probabilities. For example, source profiles and document profiles may be generated based on the metadata obtained in blocks 404 and 406. In block 410, a global vocabulary is defined as the collection of observed words from all documents of all sources, and a source vocabulary is defined for each of the sources as the collection of observed words in each of the sources. The observed words may be extracted from the documents obtained in block 406 and then normalized.

In block 412, a model for latent topics is constructed based on the dependence of the latent topics on the observed words for the collection of documents. For example, the probability of topics assigned to each of the observed words may be maximized as discussed above and then used to construct the model. Assuming that the source distribution $\overline{\gamma}$ is generated from a Dirichlet distribution with parameter $\overline{\mu}$, the total probability of the model may be expressed as shown below in equation (4):

$$P(W, Z, C, \theta, \phi; \overline{\gamma}, \overline{\alpha}, \overline{\beta}, \overline{\mu}) = P(\overline{\gamma}; \overline{\mu}) \prod_{s=1}^{S} \prod_{i=1}^{K} P(\phi_i^s; \overline{\beta}) \quad (4)$$

-continued $$\prod_{j=1}^{M^s} P(\theta_j^s; \overline{\alpha}) \prod_{x=1}^{N^s} P(Z_{j,x}^s \mid \theta_j^s) P(C_{j,x}^s \mid \overline{\gamma}) P\left(W_{j,x}^s \mid \phi_{Z_{j,x}^s}^{C_{j,x}^s}\right)$$

In this example, $\phi$ is the S-dimensional vector where $\phi[s]=\phi^s$, $\phi^s$ is the word distribution in source s, $\overline{\gamma}$ is the probability distribution on sources, $\overline{\beta}$ is the V-dimensional vector where $\overline{\beta}[\tau]=\beta_\tau$, the parameter for the Dirichlet prior on the per-topic word distributions, $\overline{\mu}$ is the Dirichlet prior on source distribution, $\phi_i^s$ is the word distribution of topic i in source s, $C_{jx}^s$ is the source generating the topic distribution in the $x^{th}$ word in the $j^{th}$ document in source s, $W_{j,x}^s$ is the $x^{th}$ word in the $j^{th}$ document in source s, and the remaining variables are as described above with respect to equations (1)-(3). In block 414, the latent topics are extracted from the model via Gibbs sampling. The Gibbs sampling may be performed as discussed below. Applying collapsed Gibbs sampling to equation (4), equation (5) below can be shown:

$$P(Z_{m,n}^s = k, C_{m,n}^s = y \mid Z_{-(m,n,s)}^s, C_{-(m,n,s)}^s, W; \overline{\alpha}, \overline{\beta}, \overline{\mu}) \propto \quad (5)$$

$$P(Z_{m,n}^s = k, Z_{-(m,n,s)}^s, C_{m,n}^s = y, C_{-(m,n,s)}^s, W; \overline{\alpha}, \overline{\beta}, \overline{\mu}) \propto$$

$$\frac{\left(n_{m,(.)}^{k,(s),-(m,n,s)} + \alpha_k\right)}{\left(\sum_{i=1}^{K} n_{m,(.)}^{i,(s),-(m,n,s)} + \alpha_i\right)} \cdot \frac{\left(q_y^{-(m,n,s)} + \mu_y\right)}{\sum_{x=1}^{S}\left(q_x^{-(m,n,s)} + \mu_x\right)} \cdot \frac{\left(n_{(.),r}^{k,(y),-(m,n,s)} + \beta_v\right)}{\left(\sum_{r=1}^{V} n_{(.),r}^{k,(y),-(m,n,s)} + \beta_r\right)}$$

In this example, $q_y^{-(m,n,s)}$ is the number of words that are generated using word distributions of topics from source y, excluding the word in the $n^{th}$ position of the $m^{th}$ document in source s, and the remaining variables are as described above with respect to equations (1)-(4).

In FIG. 4B, method 414 may start in block 420 and proceed to block 422, where the next source in the collection of sources is selected. In block 424, the next document in the selected source is selected. In other words, the documents in each of the sources are iteratively processed.

In block 426, topic proportions are sampled from the selected document of the selected source. In block 428, word distributions are sampled from the selected document of the selected source. In block 430, it is determined if all the documents have been selected. If all the documents have not been selected, method 414 returns to block 424 to select the next document. In block 432, it is determined if all the sources have been selected. If all the sources have not been selected, method 414 returns to block 426 to select the next source.

In block 434, the topic distributions for each topic are sampled. In block 436, computing device 200 determines if a bicriterion is maximized, where the bicriterion maximizes the topic probabilities assigned to words while balancing the size distributions of topics across the words (i.e., ensuring that certain topics are not over-assigned). For example, the size distributions may be balanced using dynamic thresholds that are used to monitor the number of topics assigned to each word. If the bicriterion is not maximized, computing device 200 may reset the selected sources in block 428 and then return to block 422 to repeat the sampling process. In this case, the sampling parameters may be adjusted based on the topic distribution. If the bicriterion is maximized, method 414 proceeds to block 440, where method 414 may stop.

The DDA modeling technique discussed above is naturally attuned to handling heterogeneous sources. After the weighing of sources is configured (e.g., whether the importance of the sources would be proportional to the volume of their content or not), the DDA modeling technique is parameterized by $\epsilon$, which depends upon how much average divergence between the local and global topics is acceptable. It is observed that the average divergence is small and relatively stable for $0<\epsilon<0.25$.

Over a wide range of heterogeneous sources including social media, news sources, blogs, document repositories, online retailer sites, emails, discussion forums, and radio transcripts, the DDA modeling technique provides superior performance in integrating heterogeneous web sources, which allows for efficient data-compression. Further, topic-topic correspondence between different topics is achieved. DDA topics are separated more proficiently, which provides for a higher probability that each latent topic detected addresses a different semantic topic. The DDA modeling technique can be used in applications such as summarization of documents, identification of correlated documents in heterogeneous sources, topical categorization of documents, and social search.

A further advantage of the DDA modeling technique is that it is a general model in which additional features can be easily and naturally added. In general, the bi-criterion that DDA maximizes is as shown below in equation (6):

$$\max \frac{P(Z \mid F)}{P(Z)} = \max \frac{\prod_{j=1}^{|F|} P(Z \mid f_j)}{P(Z)} \quad (6)$$

In this case, F is the set of features, $f_i$ is the $i^{th}$ feature, and Z is the topic assignment. The features considered in the examples above are the document based topic distribution and word based topic distribution; however, other features such as temporal topic distribution (i.e., probability of the observed topic assignment given time), or labels can be added.

Figure 5:
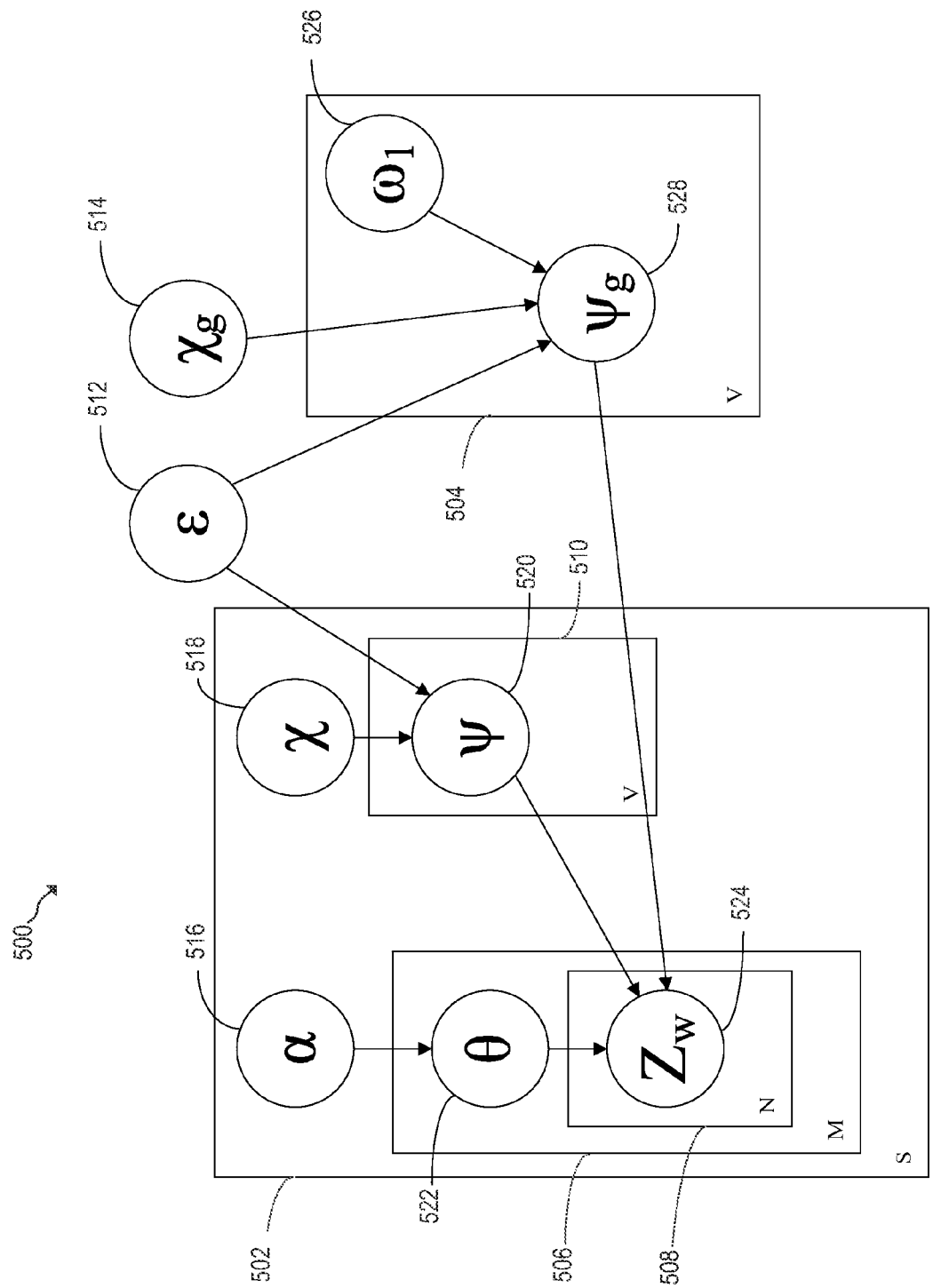
FIG. 5 is a diagram of an example plate notation of variables used to integrate and extract topics from content of heterogeneous sources.

FIG. 5 is a diagram of an example plate notation 500 of parameters used to integrate and extract topics from content of heterogeneous sources. The plate notation 500 includes a sources plate 502 and a global vocabulary plate 504. A plate is a grouping of parameters as described below. The sources plate 502 further includes a source vocabulary plate 510 and a documents plate 506, which further includes a words plate 508. Each plate groups parameters into a subgraph that repeats, where the number shown on the plate represents the number of repetitions of the subgraph in the plate. In this case, the parameters in the subgraph are indexed by the number (e.g. S, M, N, V), and any relationships between parameters that cross a plate boundary are repeated for each repetition. The plate notation 500 also includes two parameters that occur outside the bounds of all plates, weights ($\epsilon$) 512 and global Dirichlet prior parameter ($X_g$) 514 for the global per-word topic distributions.

The sources plate 502 includes an $\alpha$ parameter 516 for the Dirichlet prior on per-document topic distributions and a Dirichlet prior parameter (X) 518 for the per-word topic distributions. The documents plate 506 includes a document topic probability parameter ($\theta$) 522. The words plate 508 includes a topic parameter ($Z_w$) 524. The source vocabulary plate 510 includes a word probability parameter 520. The global vocabulary plate 504 includes a source weight parameter 526 and a global word probability parameter 528. Dirichlet prior parameters may be Dirichlet distributions that are used as prior distributions in Bayesian inference. For example, a Dirichlet prior parameter may be a symmetric Dirichlet distribution, where all parameters are equal. In this example, no component is favored because there is no prior information.

The foregoing disclosure describes a number of example embodiments for integrating and extracting topics from content of heterogeneous sources. In this manner, the embodiments disclosed herein enable integrating and extracting topics for heterogeneous sources by extracting global topics from the sources' documents while also preserving the inter-document, intra-document, intra-source and inter-source statistical relationships.

We claim:

1. A system for integrating and extracting topics from content of heterogeneous sources, the system comprising:
a processor to:
identify a plurality of observed words in documents that are received from the heterogeneous sources;
obtain document metadata and source metadata from the heterogeneous sources;
use the document metadata to calculate a plurality of word topic probabilities for the plurality of observed words;
use the source metadata to calculate a plurality of source topic probabilities for the plurality of observed words; and
determine a latent topic for one of the documents based on the plurality of observed words, the plurality of word topic probabilities, and the plurality of source topic probabilities, wherein the latent topic is determined using a Discriminative Dirichlet Allocation (DDA) modeling technique comprising:
in response to determining that a number of occurrences of related observed words assigned to the latent topic has reached a dynamic threshold, adjusting a word topic probability based on pre-determined user-defined features; and
adjusting the word topic probability of an observed word based on a source topic probability of the source topic probabilities associated with the observed word, wherein the adjusting the word topic probability of the observed word comprises using Gibbs sampling to apply a bicriterion that maximizes the plurality of word topic probabilities and uses the dynamic threshold to monitor the number of occurrences of the related observed words.

2. The system of claim 1, wherein the processor is further to use a global vocabulary and a global Dirichlet prior parameter to determine a plurality of global word topic probabilities, wherein the latent topic is further based on the plurality of global word topic probabilities.

3. The system of claim 1, wherein the heterogeneous sources comprise a news source, a blog source, a social media source, a document repository source, an online retailer source, an email source, and a discussion forum source.

4. A method, implemented at least in part by a computing device, for integrating and extracting topics from content of heterogeneous sources, the method comprising:
identifying, by using the computing device, a plurality of observed words in documents that are received from the heterogeneous sources;
preserving document metadata and source metadata from the heterogeneous sources;
using the document metadata to calculate a plurality of word topic probabilities for the plurality of observed words;
using the source metadata to calculate a plurality of source topic probabilities for the plurality of observed words; and
using a Discriminative Dirichlet Allocation (DDA) modeling technique to determine a latent topic for one of documents based on the plurality of observed words, the plurality of word topic probabilities, and the plurality of source topic probabilities, wherein the DDA modeling technique comprises:
in response to determining that a number of occurrences of related observed words assigned to the latent topic has reached a dynamic threshold, adjusting a word topic probability based on pre-determined user-defined features; and
adjusting the word topic probability of an observed word based on a source topic probability of the source topic probabilities associated with the observed word, wherein the adjusting the word topic probability of the observed word comprises using Gibbs sampling to apply a bicriterion that maximizes the plurality of word topic probabilities and uses the dynamic threshold to monitor the number of occurrences of the related observed words.

5. The method of claim 4, further comprising using a global vocabulary and a global Dirichlet prior parameter to determine a plurality of global word topic probabilities, wherein the latent topic is further based on the plurality of global word topic probabilities.

6. The method of claim 4, wherein the heterogeneous sources comprise a news source, a blog source, a social media source, a document repository source, an online retailer source, an email source, and a discussion forum source.

7. A non-transitory machine-readable storage medium encoded with instructions executable by a processor for integrating and extracting topics from content of heterogeneous sources, the machine-readable storage medium comprising instructions to:
identify a plurality of observed words in documents that are received from the heterogeneous sources;
obtain document metadata and source metadata from the heterogeneous sources;
use the document metadata to calculate a plurality of word topic probabilities for the plurality of observed words;
use a global vocabulary and a global Dirichlet prior parameter to determine a plurality of global word topic probabilities;
use the source metadata to calculate a plurality of source topic probabilities for the plurality of observed words; and
determine a latent topic for one of the documents based on the plurality of observed words, the plurality of word topic probabilities, the plurality of global word topic probabilities, and the plurality of source topic probabilities, wherein the latent topic is determined using a Discriminative Dirichlet Allocation (DDA) modeling technique that comprises:
in response to determining that a number of occurrences of related observed words assigned to the latent topic has reached a dynamic threshold, adjusting word topic probability based on pre-determined user-defined features; and
adjusting the word topic probability of an observed word based on a source topic probability of the source topic probabilities associated with the observed word, wherein the adjusting the word topic probability of the observed word comprises using Gibbs sampling to apply a bicriterion that maximizes the plurality of word topic probabilities and uses the dynamic threshold to monitor the number of occurrences of the related observed words.

8. The non-transitory machine-readable storage medium of claim 7, wherein the heterogeneous sources comprise a news source, a blog source, a social media source, a document repository source, an online retailer source, an email source, and a discussion forum source.

* * * * *